US009202286B2

(12) United States Patent
Kita

(10) Patent No.: US 9,202,286 B2
(45) Date of Patent: Dec. 1, 2015

(54) IMAGE PROCESSING APPARATUS, COMPUTER-READABLE MEDIUM STORING AN IMAGE PROCESSING PROGRAM, AND IMAGE PROCESSING METHOD

(71) Applicant: NK WORKS CO., LTD., Wakayama-shi, Wakayama (JP)

(72) Inventor: Koji Kita, Wakayama (JP)

(73) Assignee: NK WORKS CO., LTD., Wakayama-shi (JP)

( * ) Notice: Subject to any disclaimer, the term of this patent is extended or adjusted under 35 U.S.C. 154(b) by 0 days.

(21) Appl. No.: 14/323,250

(22) Filed: Jul. 3, 2014

(65) Prior Publication Data

US 2015/0023554 A1 Jan. 22, 2015

(30) Foreign Application Priority Data

Jul. 16, 2013 (JP) .................................. 2013-147795

(51) Int. Cl.
*G06K 9/00* (2006.01)
*G06T 7/20* (2006.01)

(52) U.S. Cl.
CPC ..... *G06T 7/2053* (2013.01); *G06T 2207/20081* (2013.01); *G06T 2207/30236* (2013.01)

(58) Field of Classification Search
USPC ....................................................... 382/133
See application file for complete search history.

(56) References Cited

U.S. PATENT DOCUMENTS

| 2007/0058837 A1* | 3/2007 | Boregowda et al. ........... 382/103 |
| 2007/0280540 A1* | 12/2007 | Ikeda ............................. 382/195 |
| 2013/0071032 A1* | 3/2013 | Nishino ......................... 382/195 |

FOREIGN PATENT DOCUMENTS

| JP | 2011-123742 A | 6/2011 |
| JP | 2013-65151 A | 4/2013 |

* cited by examiner

*Primary Examiner* — Yon Couso
(74) *Attorney, Agent, or Firm* — Westerman, Hattori, Daniels & Adrian, LLP

(57) ABSTRACT

The image processing apparatus for detecting a moving object in a moving image includes a background generation unit configured to generate a background image of the moving image while updating the background image over time. The background generation unit includes a model derivation unit configured to derive a mixed distribution model having one or more distribution models for each pixel of interest, and a background value derivation unit configured to derive one or more background pixel values respectively corresponding to the one or more distribution models. The model derivation unit is configured to generate a new distribution model from pixel values of a plurality of pixels within a local region containing the pixel of interest in a first frame, and update the existing distribution model using a pixel value of the pixel of interest in a second frame that is different from the first frame.

20 Claims, 12 Drawing Sheets

IMAGE PROCESSING APPARATUS, COMPUTER-READABLE MEDIUM STORING AN IMAGE PROCESSING PROGRAM, AND IMAGE PROCESSING METHOD

FIELD OF INVENTION

The present invention relates to an image processing apparatus, a computer-readable medium storing an image processing program, and an image processing method for detecting a moving object in a moving image.

BACKGROUND

Conventionally, detection of a moving object in a moving image using a background image has been practiced. Typically, in this case, difference images are derived from frames that are contained in the moving image and a background image, and a region appearing in binarized images of these difference images is detected as a region including the moving object.

There are cases where a plurality of background values (pixel values representing the background) are set for each pixel in such a background image so that, for example, in the case where plants in the background sway in the wind, and a state in which a certain pixel represents the plants and a state in which that pixel represents the sky are repeated, both of these states can be recognized as the background. Also, in the case where some object appears in a screen, and that object does not move for at least a certain period of time, after a certain point in time, it may become appropriate to consider the object to be the background, rather than considering it to be a moving object serving as a search target.

In order to set a plurality of background values as described above, a mixed distribution model that is obtained by combining a plurality of distributions can be used (see Patent Literatures 1 (JP 2011-123742A) and Patent Literature 2 (JP 2013-65151A)). Taking the above-described swaying of plants as an example, one of these distributions indicates a probability distribution of the pixel value (first background value) representing the plants, and another indicates a probability distribution of the pixel value (second background value) representing the sky.

Conventionally, such a mixed distribution model is statistically generated for each pixel based on data on a large number of pixel values of that pixel that are obtained along a time axis. In this regard, according to Patent Literature 1, no mixed distribution model for determining the background values is generated until a certain preparation time has elapsed and a sufficient number of pixel values have been obtained for a single pixel. On the other hand, according to Patent Literature 2, in an initial stage at which a first pixel value has been obtained, a distribution is generated from only data on that single pixel value. Specifically, the single pixel value is used as the initial value of the mean of the distribution, and a predetermined initial value is used as the range (variance etc.) of the distribution around that mean value. Also, according to Patent Literature 2, during update of a mixed distribution model, when a pixel value that cannot be classified into any existing distribution is obtained, a distribution into which that single pixel value is classified is generated in a like manner. It should be noted that such an outlier may occur when another background appears, for example.

If a mixed distribution model is generated according to a method such as those described above, the moving object cannot be detected in the initial stage (in the case of Patent Literature 1), or the detection accuracy is unstable (in the case of Patent Literature 2). That is to say, as disclosed in Patent Literature 2, if an initial mixed distribution model is generated from only the data on the first pixel value without using data on a large number of actual pixel values, it is unlikely that the generated model appropriately models the actual scene, and erroneous detection tends to occur for a while afterwards. Similarly, if an outlier occurs during update of the mixed distribution model, erroneous detection tends to occur for a while afterwards.

It is an object of the present invention to provide an image processing apparatus, a computer-readable medium storing an image processing program, and an image processing method that can set an appropriate background value in an initial stage and/or during update of a background image and detect a moving object with high accuracy.

SUMMARY of INVENTION

An image processing apparatus according to a first aspect of the invention is an image processing apparatus configured to detect a moving object in a moving image, the apparatus including a background generation unit configured to generate a background image of the moving image while updating the background image over time and a moving object detection unit configured to detect the moving object in the moving image over time based on the background image. The background generation unit includes a model derivation unit configured to derive a mixed distribution model for each pixel of interest, the mixed distribution model having one or more distribution models depending on a situation, and a background value derivation unit configured to derive one or more background pixel values respectively corresponding to the one or more distribution models based on the mixed distribution model for each pixel of interest. The model derivation unit is configured to generate a new distribution model from pixel values of a plurality of pixels within a local region containing the pixel of interest in a first frame that is contained in the moving image, and update the existing distribution model using a pixel value of the pixel of interest in a second frame that is contained in the moving image and that is different from the first frame.

With this configuration, for each pixel of interest, a mixed distribution model having one or more distribution models for determining one or more background values is generated while being updated. During generation of a distribution model that is contained in the mixed distribution model, for example, in an initial stage at which a sufficient number of frames are not obtained yet, not only the pixel value of the pixel of interest but also the pixel values of pixels surrounding that pixel of interest are used. As another example, it is conceivable that during update of the mixed distribution model, even if an outlier that cannot be classified into any existing distribution model occurs, a distribution model is generated using surrounding pixel values of the pixel of interest. Afterwards, when another frame is obtained, the existing distribution model is updated using the pixel value of the same pixel of interest in the other frame. That is to say, with this configuration, during generation of a new distribution model, not only the pixel value of the pixel of interest but also the pixel values of surrounding pixels are used. In other words, on the assumption that a distribution of pixel values that are obtained within a local region around a pixel of interest within a single frame is generally equal to a temporal distribution of pixel values at the pixel of interest, before the latter distribution is obtained, the surrounding pixel values of the pixel of interest are substituted for the temporal distribution of pixel values. Consequently, even in the case of a moving image containing much noise, the effect of such noise (variations in pixel values) can be properly evaluated. Accordingly, it is possible to set an appropriate background value in an initial stage and/or during update of the background image and to detect the moving object with high accuracy.

An image processing apparatus according to a second aspect of the invention is the image processing apparatus according to the first aspect, wherein if the mixed distribution model is not present, the model derivation unit is configured to generate a new distribution model. With this configuration, it is possible to set an appropriate background value in an initial stage and to detect the moving object with high accuracy.

An image processing apparatus according to a third aspect of the invention is the image processing apparatus according to the first or second aspect, wherein if a pixel value of the pixel of interest in the first frame is not contained in any existing distribution model, the model derivation unit is configured to generate a new distribution model. With this configuration, it is possible to set an appropriate background value during update of the background image and to detect the moving object with high accuracy.

An image processing apparatus according to a fourth aspect of the invention is the image processing apparatus according to any of the first to third aspects, the apparatus further including a display control unit configured to display a frame including the detected moving object. With this configuration, it is possible for the user to visually check the moving object search results.

An image processing apparatus according to a fifth aspect of the invention is the image processing apparatus according to the fourth aspect, wherein if it is detected that the moving object is present in two frames that are contained in the moving image and that are close to each other, and a direction of an optical flow of the moving object between the two frames matches a direction of movement of the centroid of the moving object between the two frames, the display control unit is configured to exclude the moving object in one of the two frames from a display target.

In a moving image, a large number of frames are arranged at minute time intervals. Accordingly, if a moving object moves within the screen of a moving image, that moving image contains a large number of frames including the moving object in slightly different positions or shapes. Therefore, if all of the frames in which the moving object is detected are displayed as the search results, the user is required to check an enormous amount of frames including the same object one by one. On the other hand, if the direction of the optical flow between a moving object in a frame and a moving object in another frame that is close to the former frame on the timeline of the moving image matches the direction of movement of the centroids of the moving objects, those moving objects are expected to be the same object. Therefore, with this configuration, if there is a match as described above, the moving object in one of the two frames is excluded from the display target, thereby suppressing redundant display of the frames including the same object as the search results. Accordingly, with this configuration, the redundancy of the search results is suppressed, making it easy for the user to check the search results.

An image processing apparatus according to a sixth aspect of the invention is the image processing apparatus according to the fourth or fifth aspect, the apparatus further including a setting unit configured to receive setting of a color of the moving object. The display control unit is configured to exclude the moving object having a color that is not similar to the set color from the display target.

With this configuration, the user can set an attribute relating to the color of the search target. The set attribute value is used for search, and a moving object having a color that is not similar to this attribute value is excluded from the display target. Therefore, display of a frame including a moving object that the user does not look for as the search results is suppressed. Accordingly, the search accuracy is improved, making it easy for the user to check the search results.

An image processing apparatus according to a seventh aspect of the invention is the image processing apparatus according to any of the fourth to sixth aspects, the apparatus further including an receiving unit configured to receive setting of a size and/or a shape of the moving object. The display control unit is configured to exclude the moving object having a size and/or a shape that is not similar to the set size and/or shape from the display target.

With this configuration, the user can set an attribute relating to the size and/or the shape of the search target. The set attribute value is used for search, and a moving object whose size and/or shape is not similar to this attribute value is excluded from the display target. Therefore, display of a frame including a moving object that the user does not look for as the search results is suppressed. Accordingly, the search accuracy is improved, making it easy for the user to check the search results.

An image processing apparatus according to an eighth aspect of the invention is the image processing apparatus according to any of the first to seventh aspects, the apparatus further including a judgement unit configured to judge whether or not identical frames consecutively appear in the moving image. If it is judged that identical frames consecutively appear in the moving image, generation of the background image and detection of the moving object with respect to a part of the consecutive identical frames are omitted.

Depending on the conditions etc. at the time when a moving image is captured or recorded, there are cases where a plurality of identical frames are recorded consecutively along the timeline. For example, this may happen in the case where the frame rate of a recording apparatus is higher than the frame rate of an image capturing apparatus. With regard to this example, more specifically, if the capturing apparatus has a frame rate of 1 FPS, and the image recording apparatus has a frame rate of 30 FPS, for example, about 30 identical frames are consecutively arranged on the timeline of the recorded moving image. It is inefficient to repeat the processing for generating a background image and detecting the moving object with respect to these identical frames.

Therefore, with this configuration, prior to generation of the background image and detection of the moving object, it is judged whether or not identical frames consecutively appear in the moving image. Then, for a part of frames that are judged to be the identical frames, generation of the background image and detection of the moving object are not executed. Consequently, generation of the background image and detection of the moving object can be efficiently performed.

It should be noted that there are cases where even though a plurality of identical frames must have been recorded, those frames are not completely identical due to the effect of various kinds of noise such as analog noise. However, frames that are "similar frames" to be exact are regarded as "identical frames" if the difference is as small as that caused by noise.

A non-transitory computer-readable medium storing an image processing program according to a ninth aspect of the invention is a computer-readable medium storing an image processing program for detecting a moving object in a moving image, the program causing a computer to execute the steps of generating a background image of the moving image while updating the background image over time, and detecting the moving object in the moving image over time based on the background image. The step of generating the background image includes the steps of deriving a mixed distribution model for each pixel of interest, the mixed distribution model having one or more distribution models depending on a situation, and deriving one or more background pixel values respectively corresponding to the one or more distribution models based on the mixed distribution model for each pixel of interest. The step of deriving the mixed distribution model includes the steps of generating a new distribution model from pixel values of a plurality of pixels within a local region containing the pixel of interest in a first frame that is contained in the moving image, and updating the existing distribution model using a pixel value of the pixel of interest in a second frame that is contained in the moving image and that is different from the first frame. With this configuration, the same effects as the first aspect can be achieved.

An image processing method according to a tenth aspect of the invention is an image processing method for detecting a moving object in a moving image, the method including the steps of generating a background image of the moving image while updating the background image over time, and detecting the moving object in the moving image over time based on the background image. The step of generating the background image includes the steps of deriving a mixed distribution model for each pixel of interest, the mixed distribution model having one or more distribution models depending on a situation, and deriving one or more background pixel values respectively corresponding to the one or more distribution models based on the mixed distribution model for each pixel of interest. The step of deriving the mixed distribution model includes the steps of generating a new distribution model from pixel values of a plurality of pixels within a local region containing the pixel of interest in a first frame that is contained in the moving image, and updating the existing distribution model using a pixel value of the pixel of interest in a second frame that is contained in the moving image and that is different from the first frame. With this configuration, the same effects as the first aspect can be achieved.

DETAILED DESCRIPTION OF THE PREFERRED EMBODIMENTS

Hereinafter, an image processing apparatus, a computer-readable medium storing an image processing program, and an image processing method according to an embodiment of the present invention will be described with reference to the drawings.

1. Hardware Configuration of Image Processing Apparatus

Figure 1:
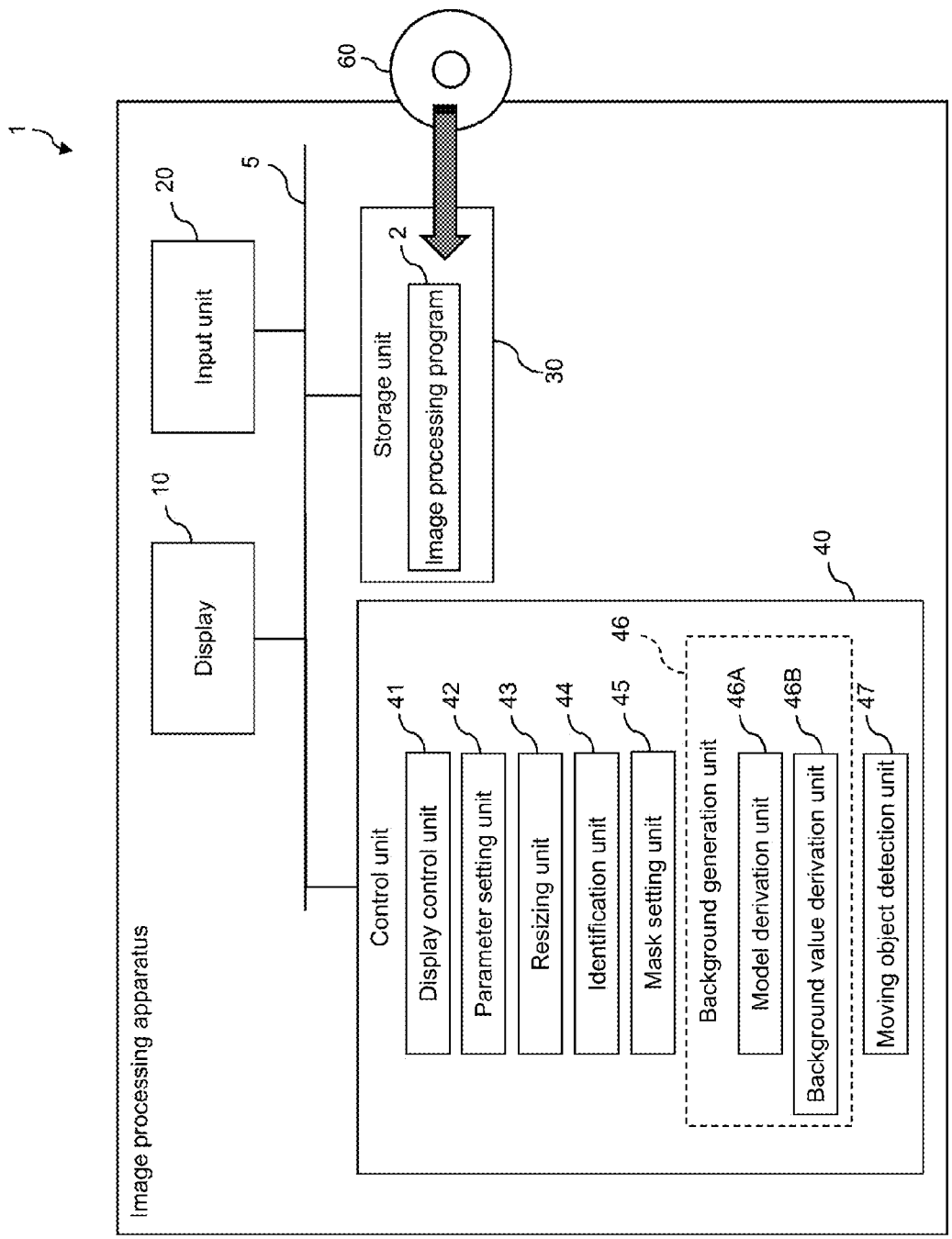
FIG. 1 is a block diagram showing the configuration of an image processing apparatus according to an embodiment of the present invention.

An image processing apparatus 1 shown in FIG. 1 is an embodiment of the image processing apparatus according to the present invention. The hardware of the image processing apparatus 1 is a general-purpose personal computer. An image processing program 2, which is an embodiment of the image processing program according to the present invention, is provided and installed in the image processing apparatus 1 from a computer-readable recording medium 60 etc., such as a CD-ROM, a USB memory, or the like, which stores the image processing program 2. The image processing program 2 is application software for assisting image processing of moving images and has a function of automatically detecting a moving object in a moving image. The image processing program 2 causes the image processing apparatus 1 to execute steps contained in an operation that will be described later. It should be noted that a moving image as used herein is not limited to data that is stored in a moving image file format such as MPEG or AVI, but includes a data set that the image processing apparatus 1 can recognize as having a sequence along the time axis, even if the data set is a group of multiple still images that are stored in a still image file format. At this time, the sequence of the still image group along the time axis can be recognized based on the filenames or values stored in headers of image files. Also, it should be noted that "group" as used herein is not limited to a plurality of elements, and the number of elements of the group may be one.

The image processing apparatus 1 has a display 10, an input unit 20, a storage unit 30, and a control unit 40. These units 10 to 40 are connected to one another by a bus line, a cable, etc. 5 and can communicate with one another as appropriate. The display 10 is composed of a liquid crystal display etc., and displays screens, which will be described later, to a user. The input unit 20 is composed of a mouse and a keyboard, or the like, and accepts a user operation on the image processing apparatus 1. The storage unit 30 is a nonvolatile storage area that is composed of a hard disk etc., and the image processing program 2 is stored in the storage unit 30. The control unit 40 is composed of a CPU, a ROM and a RAM, or the like.

The control unit 40 reads out and executes the image processing program 2 stored in the storage unit 30, thereby virtually operating as a display control unit 41, a parameter setting unit 42, a resizing unit 43, an identification unit 44, a mask setting unit 45, a background generation unit 46, and a moving object detection unit 47. In particular, the background generation unit 46 operates as a model derivation unit 46A and a background value derivation unit 46B during execution of a moving object detection process, which will be described later. The operations of the various units 41 to 47, 46A, and 46B will be described later.

2. Playback Process

Figure 2:
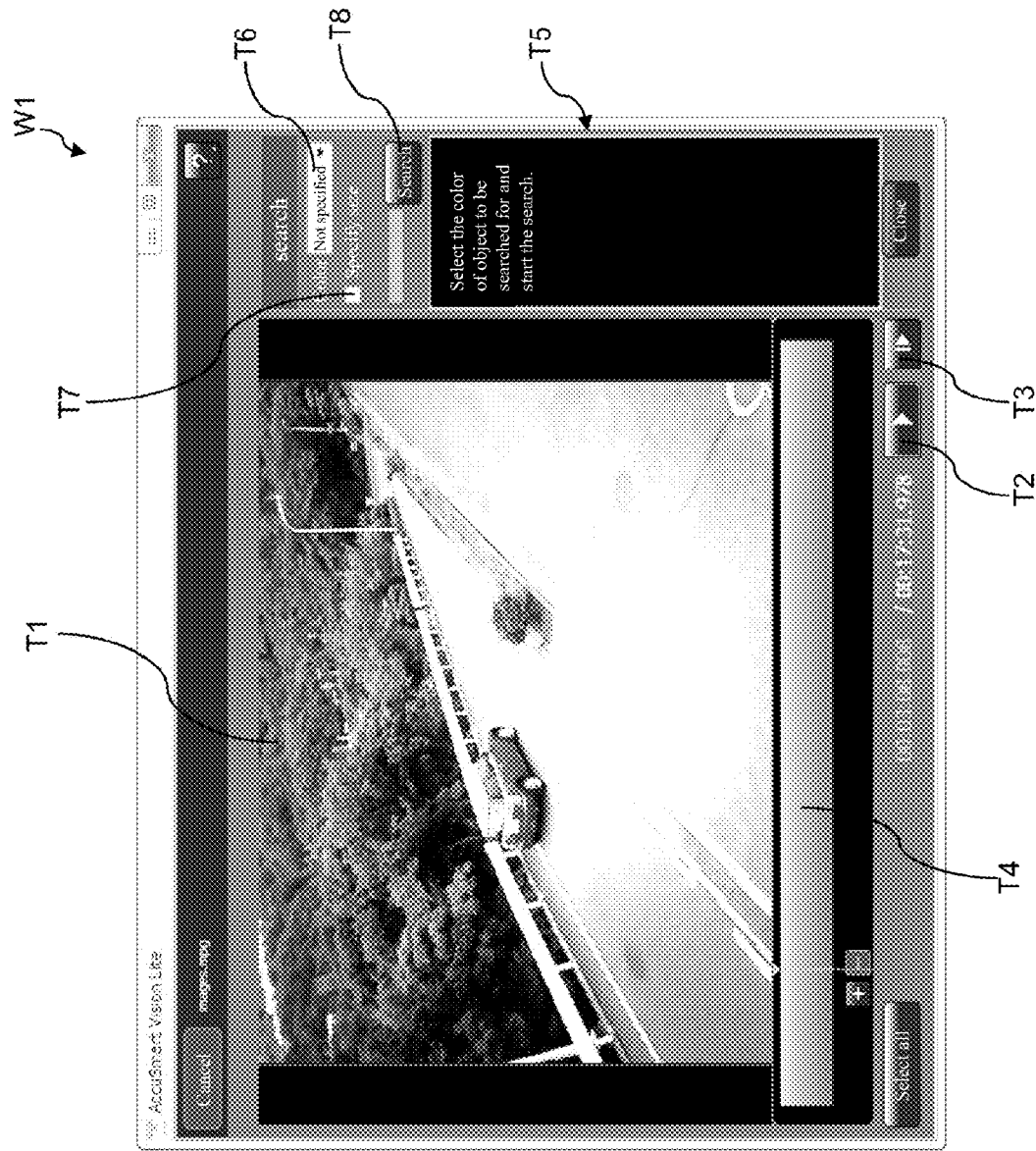
FIG. 2 is a screenshot showing a main screen before execution of a moving object detection process.

When the control unit 40 detects that the user has performed a predetermined operation through the input unit 20, the control unit 40 activates the image processing program 2. When the image processing program 2 is activated, the display control unit 41 displays a main screen W1 shown in FIG. 2 on the display 10. It should be noted that the display control unit 41 controls the display of screens, buttons, and all other elements that are displayed on the display 10 according to an instruction of the image processing program 2.

A playback area T1, a playback button T2, a frame forward button T3, and a timeline bar T4 are arranged on the main screen W1. The display control unit 41 can play back a moving image that is specified by the user in the playback area T1. The user can specify a moving image to be played back by, for example, dragging and dropping an icon of a moving image file or an icon of a folder in which a still image file group is saved, the icons being displayed on the display 10, over the main screen W1. At this time, the first frame that is displayed in the playback area T1 is, for example, the leading frame of a frame group that is contained in the moving image.

The playback button T2 accepts a command from the user to play back the moving image. When it is detected that the user has pressed the playback button T2, the display control unit 41 displays a frame group contained in the moving image in the playback area T1 in such a manner that individual frames are sequentially displayed along the timeline. It should be noted that the playback begins with a frame that is displayed in the playback area T1 at the point in time when the playback button T2 is pressed. Moreover, the playback button T2 accepts a command from the user to stop playback. When it is detected that the user has pressed the playback button T2 during playback, the display control unit 41 fixes the display in the playback area T1 to a frame that is displayed at that point in time.

The frame forward button T3 accepts a command from the user to change a frame that is displayed in the playback area T1 to a frame directly after that frame along the timeline of the moving image.

The timeline bar T4 is an object that graphically represents the timeline of the moving image. The timeline bar T4 is equally divided in a direction in which the bar extends into the same number of parts as the number of frames that are contained in the moving image. An "n"th divided region from the left on the timeline bar T4 corresponds to an "n"th frame of the moving image on the timeline ("n" is a natural number).

The timeline bar T4 accepts the selection of any desired frame contained in the moving image from the user. Accordingly, when the user selects a particular divided region on the timeline bar T4 by, for example, clicking thereon, the frame that is displayed in the playback area T1 is immediately changed to a frame corresponding to the selected divided region.

3. Moving Object Detection Process

Hereinafter, the moving object detection process of automatically searching for a moving object in a moving image will be described. This process can be used to, for example, find a suspect, a suspected vehicle, etc. from an enormous amount of monitoring images captured by a security camera. The search results of the moving object detection process are displayed in a search result area T5 on the main screen W1 by the display control unit 41 (see FIG. 9). At this time, thumbnail images of those frames of the frame group contained in the moving image from which a moving object serving as a search target is detected are displayed in list form in the search result area T5. In the following description, the flow of the operation for setting parameters for use in the moving object detection process will be described as an advance preparation, and then the flow of the moving object detection process will be described in detail.

3-1. Setting of Parameters

One of the parameters for use in the moving object detection process is a parameter (hereinafter referred to as "color parameter $P_1$") that specifies the color of the moving object serving as the search target. Setting of the color parameter $P_1$ is accepted through a color setting pull-down menu T6 on the main screen W1, and in this embodiment, the options are "not specified", "red", "blue", "green", "yellow", "white", and "black". When a particular color is set as the color parameter $P_1$ on the pull-down menu T6, only a frame including a moving object, of moving objects detected by the moving object detection process, that has a color similar to the set color is displayed in the search result area T5 afterwards. Therefore, setting of the color parameter $P_1$ can be used in cases where the color of the moving object serving as the search target is known in advance, such as a case where, for example, an investigation agency, which is the user, including the police etc. looks for a red suspected vehicle or a suspect wearing black clothes. On the other hand, if the color of the moving object serving as the search target is not known in advance, "not specified" is selected. The parameter setting unit 42 recognizes a value that is set in the color setting pull-down menu T6 as the color parameter $P_1$.

Figure 3:
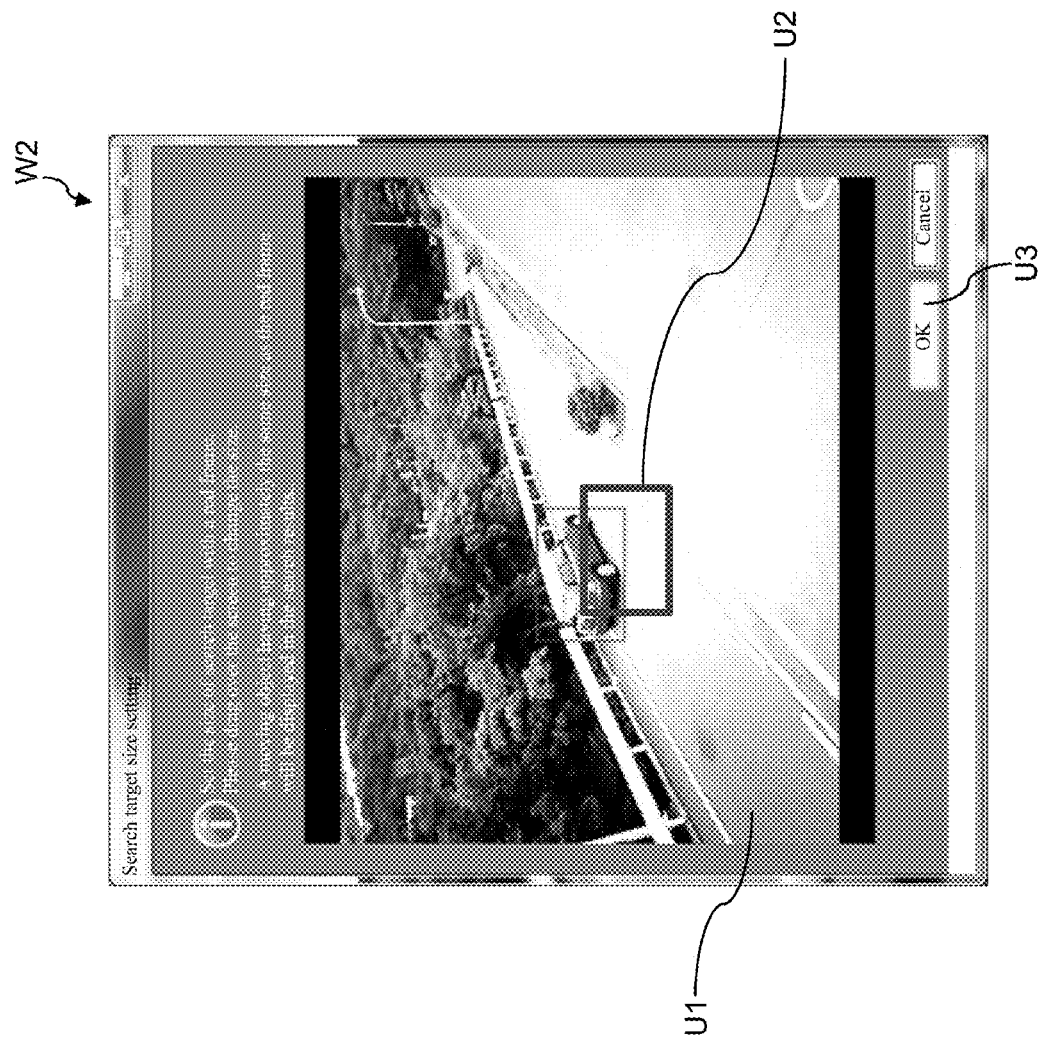
FIG. 3 is a screenshot showing a size setting screen.

Other parameters for use in the moving object detection process are parameters (hereinafter referred to as "size parameter $P_2$" and "shape parameter $P_3$", respectively) that specify the size and shape of the moving object serving as the search target. Setting of the size parameter $P_2$ and the shape parameter $P_3$ is accepted on a size setting screen W2 shown in FIG. 3. The size setting screen W2 is displayed when it is detected that a search button T8 on the main screen W1 has been pressed with a check box T7 on the main screen W1 along with which "specify size" is written being checked. A frame area U1 that displays the same frame as the frame that is currently displayed in the playback area T1 is displayed on the size setting screen W2. Also, a rectangular auxiliary frame U2 whose size, shape, and position can be freely changed by the user operating the mouse is displayed within the frame area U1. The user can set the size parameter $P_2$ and the shape parameter $P_3$ by adjusting the size and shape of this auxiliary frame U2.

Specifically, the parameter setting unit 42 recognizes the dimensions of an area that is surrounded by the auxiliary frame U2 as the size parameter $P_2$ and recognizes the aspect ratio of that area as the shape parameter $P_3$. That is to say, the user can specify an approximate size of the search target and an approximate shape of the search target, such as whether the search target is horizontally long or vertically long. When a particular size and shape are set as the parameters $P_2$ and $P_3$ by deforming the auxiliary frame U2, only a moving object whose size and shape are similar to the set size and shape, of the moving objects detected by the moving object detection process, is displayed as the search results in the search result area T5 afterwards. Therefore, setting of the parameters $P_2$ and $P_3$ can be used in cases where an approximate size and shape of the moving object serving as the search target are known in advance. For example, if a vehicle is searched for, an approximate size and shape of the vehicle in the screen can be expected, and thus the size and shape can be set. On the other hand, if the size and shape of the moving object serving as the search target are not known in advance, the check box T7 on the main screen W1 can be unchecked. It should be noted that the position of the auxiliary frame U2 does not affect the setting of the parameters $P_2$ and $P_3$. However, allowing the auxiliary frame U2 to be placed in any desired position within the frame area U1 helps to appropriately set the size and shape of a suspected vehicle etc. serving as the search target based on an image of an automobile, a road, or a person that is displayed within the frame area U1.

Figure 4:
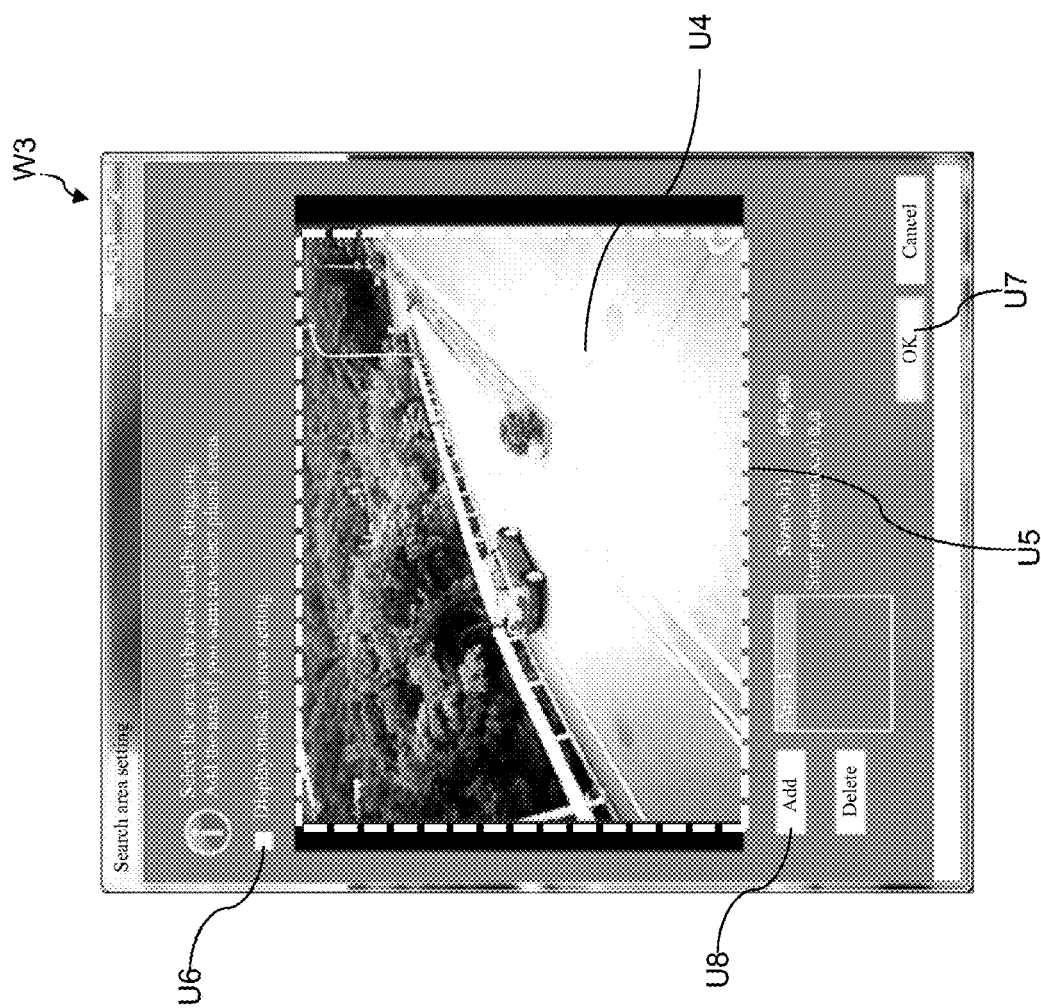
FIG. 4 is a screenshot showing a search area setting screen.

When it is detected that the user has pressed an OK button U3 on the size setting screen W2, a search area setting screen W3 shown in FIG. 4 is displayed instead of the size setting screen W2. The search area setting screen W3 accepts setting of another parameter (hereinafter referred to as "area parameter $P_4$") for use in the moving object detection process, the area parameter $P_4$ specifying a range in which the moving object is searched for within the screen of the moving image. It should be noted that the search area setting screen W3 is displayed even when it is detected that the search button T8 on the main screen W1 has been pressed with the check box T7 on the main screen W1 being unchecked.

As in the case of the size setting screen W2, a frame area U4 that displays the same frame as the frame that is currently displayed within the playback area T1 is displayed on the search area setting screen W3. Also, a rectangular auxiliary frame U5 whose size, shape, and position can be freely changed by the user operating the mouse like the auxiliary frame U2 is displayed in the frame area U4. The user can set the area parameter $P_4$ by adjusting the size, shape, and position of this auxiliary frame U5. Specifically, the parameter setting unit 42 recognizes an area that is surrounded by the auxiliary frame U5 as the area parameter $P_4$. When a particular area is set within the search area setting screen W3, in the moving object detection process, judgement of whether or not a moving object is present is performed only within the set particular area.

Figure 5:
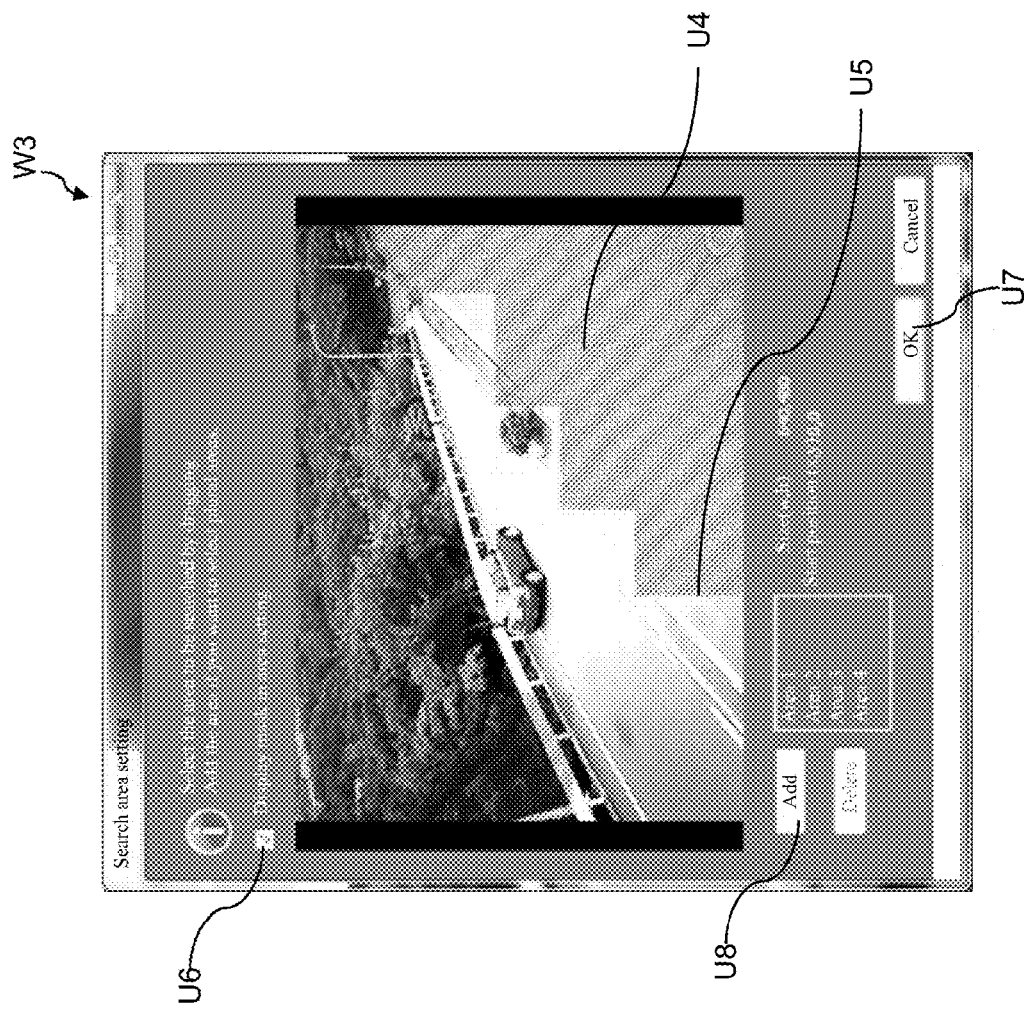
FIG. 5 is another screenshot showing the search area setting screen.
Figure 6:
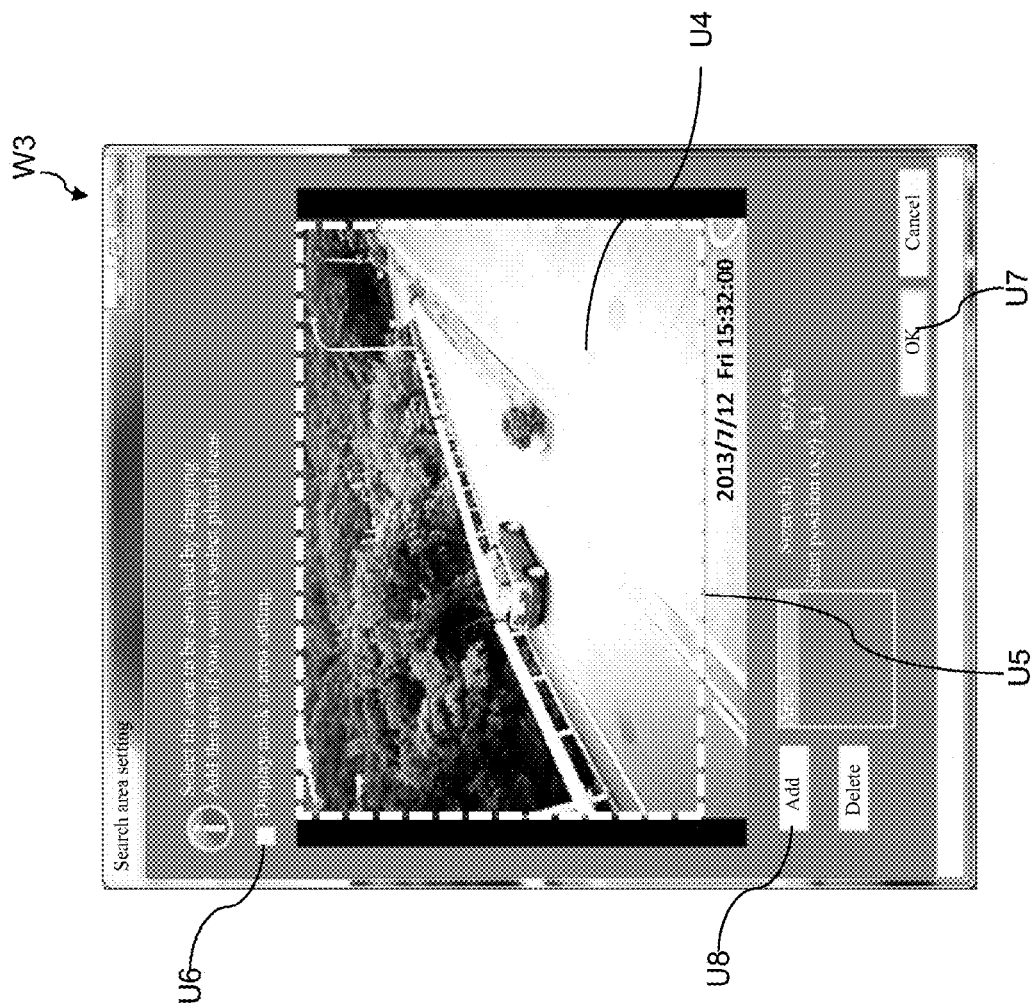
FIG. 6 is still another screenshot showing the search area setting screen.

It should be noted that the default of the auxiliary frame U5 is the entire screen of the moving image as shown in FIG. 4. Accordingly, if it is desired to detect a moving object in the entire screen of the moving image, it is unnecessary to operate the auxiliary frame U5. Also, it is possible to place a plurality of auxiliary frames U5 on the search area setting screen W3 using an add button U8 etc. This enables to set a search range of a complicated shape by superposing the auxiliary frames U5 or to set a discontinuous search range. Also, when a checkbox U6 on the search area setting screen W3 along with which "display mask in area setting" is written is checked, as shown in FIG. 5, a semitransparent mask is displayed over a mask region other than the search range that is set as the area parameter $P_4$. Even when the user specifies a search range of a complicated shape, this function enables the user to easily confirm where is the search range and where is outside the search range. Also, for example, in a monitoring image from a security camera, there are cases where caption information such as time is displayed at a predetermined position within the screen as shown in FIG. 6. The caption information frequently changes in the moving image and can thus become noise in detection of a moving object. Thus, in the case where the caption information is contained, the corresponding region can be masked using the auxiliary frame U5, thereby improving the search accuracy.

Figure 7:
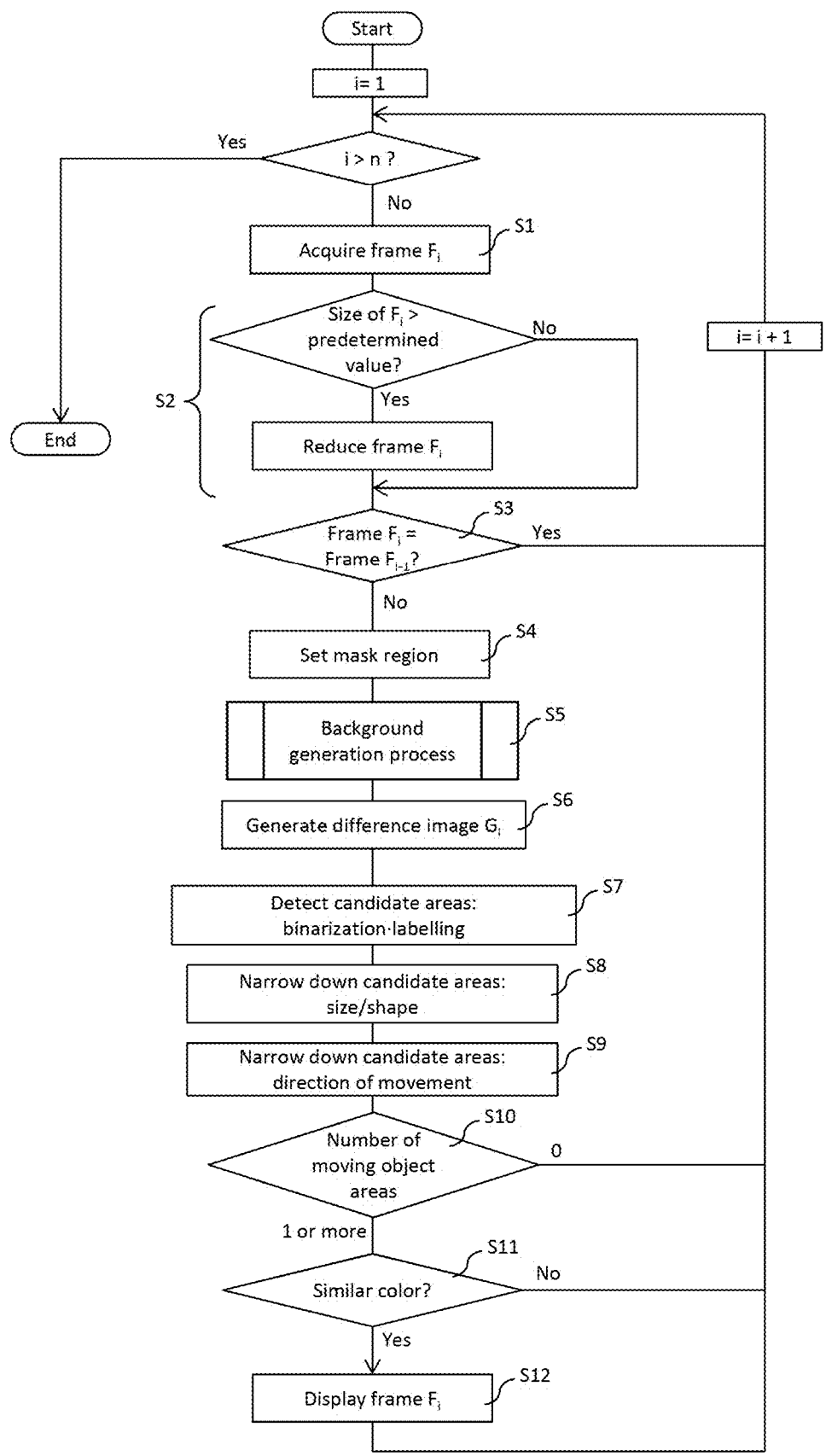
FIG. 7 is a flowchart showing the flow of the moving object detection process.

Then, when the control unit 40 detects that the user has pressed the OK button U7 on the search area setting screen W3, the control unit 40 starts the moving object detection process in FIG. 7. At this time, the search area setting screen W3 is closed, and the screen returns to the main screen W1.

3-2. Details of Moving Object Detection Process

Next, the flow of the moving object detection process will be described in detail with reference to FIG. 7. In the following description, frames contained in a moving image serving as a processing target are represented by $F_1, F_2, \ldots, F_n$ ("n" is the number of frames).

As shown in FIG. 7, steps S1 to S12 included in the moving object detection process are repeatedly executed in order with respect to the frames $F_1, F_2, \ldots, F_n$. First, in step S1, the control unit 40 sets aside a memory (including a virtual memory) for processing a frame $F_i$ and acquires the frame $F_i$ from the moving image.

Subsequently, the resizing unit 43 determines the image size of the frame $F_i$. If the image size is larger than a predetermined size, the resizing unit 43 reduces the frame $F_i$ (step S2). The predetermined size in this embodiment refers to the number of pixels on the short side and may be, for example, 360. The size reduction is performed such that the aspect ratio is maintained. Bicubic, nearest neighbor, etc. can be selected as appropriate as the size reduction algorithm. It should be noted that the image size reduction in step S2 suppresses the processing load of the subsequent steps and also suppresses erroneous judgement due to the effect of noise in image processing, which will be described later. This is because the effect of a minute change in the frame $F_i$ is cancelled. Hereinafter, the reduced frame $F_i$ is also referred to as the frame $F_i$ unless otherwise stated.

Next, the identification unit 44 judges whether or not the frame $F_i$ is the same image as a frame $F_{i-1}$ that is directly before the frame $F_i$ on the timeline. If it is judged that the frame $F_i$ is the same image as the frame $F_{i-1}$, subsequent processing of the frame $F_i$ is omitted, and the processing moves on to a frame $F_{i+i}$ that is directly after the frame $F_i$ on the timeline (step S3). Specifically, in step S3, the identification unit 44 calculates the difference between a pixel value in the frame $F_i$ and a pixel value in the frame $F_{i-1}$ for every pixel and calculates the standard deviation of these differences. If the standard deviation is larger than or equal to a threshold value, it is judged that the frame $F_i$ and the frame $F_{i-1}$ are different images, and if the standard deviation is smaller than the threshold value, it is judged that the frame $F_i$ and the frame $F_{i-1}$ are the same image. Thus, even if there is a minute difference between the frames $F_i$ and $F_{i-1}$ due to analog noise etc., the frames $F_i$ and $F_{i-1}$ can be judged to be the same frame.

Next, the mask setting unit 45 refers to the value of the area parameter $P_4$, and eliminates the mask region from the frame $F_i$ so that only the search range that is set by the user remains, if necessary (step S4). It should be noted that hereinafter the frame $F_i$ from which the mask region has been eliminated is also referred to as the frame $F_i$ unless otherwise stated.

Next, in step S5, the background generation unit 46 executes a background generation process of generating a background image $G_i$ of the frame $F_i$. The background image $G_i$ is also an image within the search range that is set by the user. The background image $G_i$ is generated based on data on the pixel values of the frames $F_1, F_2, \ldots, F_{i-1}$ that have already been acquired and loaded into the memory. The algorithm for generating the background image $G_i$ will be described later.

Next, the moving object detection unit 47 generates a difference image $H_i$ between the frame $F_i$ and the background image $G_i$ (step S6). The difference image $H_i$ is an image in which, for every pixel, the difference between the pixel value in the frame $F_i$ and the pixel value in the background image $G_i$ is taken as the pixel value of that pixel.

Next, the moving object detection unit 47 binarizes the difference image $H_i$ using a predetermined threshold value. Then, the moving object detection unit 47 performs labeling processing with respect to the obtained binarized image, thereby detecting L (L≥0) areas as areas (hereinafter referred to as "moving object areas") where a moving object is present on the frame $F_i$ (step S7). The moving object areas that are detected in this step are candidates (hereinafter referred to as "candidate areas") for areas to be ultimately judged as moving object areas.

Subsequently, the moving object detection unit 47 refers to the values of the size parameter $P_2$ and the shape parameter $P_3$, and narrows down the above-described candidate areas (step S8). Specifically, with respect to each candidate area, the moving object detection unit 47 sets a rectangular area A1 surrounding the candidate area based on four endpoints in the vertical and horizontal directions. Then, for each candidate area, if the difference between the size of the area A1 and the value of the size parameter $P_2$ is larger than a threshold value, that area is excluded from the candidate areas. For example, if $c_1 \cdot P_2 \leq$(size of area A1)$\leq c_2 \cdot P_2$ is not satisfied, the area is excluded ($c_1$ and $c_2$ are constants, and, for example, it is possible to set $c_1$=0.6 and $c_2$=1.2). Similarly, for each candidate area, if the difference between the aspect ratio of the area A1 and the value of the shape parameter $P_3$ is larger than a threshold value, that area is excluded from the candidate areas. For example, if $c_3 \cdot P_3 \leq$(aspect ratio of area A1=size of short side/size of long side)$\leq c_4 \cdot P_3$ is not satisfied, the area is excluded ($c_3$ and $c_4$ are constants, and, for example, it is possible to set $c_3$=0.6 and $c_4$=1.2). Furthermore, for each candidate area, if the ratio of the candidate area to the area A1 is excessively small, that area is also excluded from the candidate areas. It should be noted that in step S8, the reason why a candidate area is excluded based on the comparison with the parameters $P_2$ and $P_3$ that are set by the user is to prevent a frame including a moving object that the user does not look for from being displayed as the search results. If the parameters $P_2$ and $P_3$ are not set, the above-described judgement is omitted.

Subsequently, the moving object detection unit 47 focuses on the direction in which the moving object moves, and further narrows down the candidate areas that still remain after step S8 (step S9). Specifically, the moving object detection unit 47 judges whether the frame $F_{i-1}$, which comes directly before the frame $F_i$, has been subjected to step S8, and if so, whether a candidate area is present after the execution of step S8. Then, if such a candidate area is present in the frame $F_{i-1}$, for every candidate area within the frame $F_i$, whether or not the candidate area is an image of the same object as the object in the above-described candidate area in the frame $F_{i-1}$ is judged in a round-robin manner. It should be noted that in step S9, the reason why the identity of an object in a candidate area in the frame $F_i$ is checked against an object in the candidate area in the frame $F_{i-1}$ that is adjacent to the frame $F_i$ is to prevent many images of the same moving object from being displayed as the search results.

In step S9, in order to determine whether or not a particular candidate area within the frame $F_i$ and a particular candidate area within the frame $F_{i-1}$ are images of the same object, the optical flow of the particular candidate area within the frame $F_i$ is calculated. Also, the direction of movement between the centroids of the particular candidate area within the frame $F_i$ and the particular candidate area within the frame $F_{i-1}$ is calculated. Then, the moving object detection unit 47 judges whether or not the vector mean of all the motion vectors contained in this optical flow matches the direction of movement between the centroids. If they match, the moving object detection unit 47 judges that the two candidate areas are the images of the same moving object. On the other hand, if these directions do not match, the moving object detection unit 47 judges that the compared two candidate areas are the images of different objects. It should be noted that here, even if the both vectors do not completely match, it is judged that they match as long as they are similar to each other to a certain extent. If it judged that a candidate area within the frame $F_i$ is the image of the same object as the object in any candidate area within the frame $F_{i-1}$, the moving object detection unit 47 excludes that area from the candidate areas. Then, a candidate area that still remains after step S9 is determined to be an ultimate moving object area within the frame $F_i$.

In this embodiment, during the above-described calculation of the optical flow, template matching is performed on a block-by-block basis. Specifically, the moving object detection unit 47 divides a particular candidate area within the frame $F_i$ into blocks. Then, the moving object detection unit 47 searches for images of those blocks in a surrounding region containing a particular candidate area within the frame $F_{i-1}$ by template matching based on normalized cross-correlation. Then, blocks that match each other are connected to each other and the motion vectors are derived.

Next, in step S10, the moving object detection unit 47 judges the number of moving object areas that still remain after step S9. If this number is 1 or more, the processing proceeds to step S11, and if this number is 0, steps S11 and S12 are skipped, and the processing moves on to the next frame $F_{i+1}$. The reason for this is that the frame $F_i$ in which the moving object serving as the search target has not been detected is not required to be displayed as the search results in step S12.

Next, in step S11, the moving object detection unit 47 judges a representative color (or representative colors) of each moving object area that still remains after step S9. The representative color may be expressed by, for example, combining values of the saturation, density, etc. of all the pixels within each moving object area as appropriate. Subsequently, the moving object detection unit 47 calculates the distance (s) between the value of the color parameter $P_1$ and the representative color(s) of each moving object area within a color space. The moving object detection unit 47 then judges whether or not the calculated distance is smaller than a threshold value. If at least one distance is judged to be smaller than the threshold value, the processing proceeds to step S12. On the other hand, if no distance is judged to be smaller than the threshold value, step S12 is skipped, and the processing moves on to the next frame $F_{i+1}$. The reason for this is to prevent a frame including a moving object that the user does not look for from being displayed as the search result in step S12. It should be noted that the value of the parameter is referred to immediately after the start of step S11, and if this value is "not specified", the above-described judgement is omitted.

Figure 8:
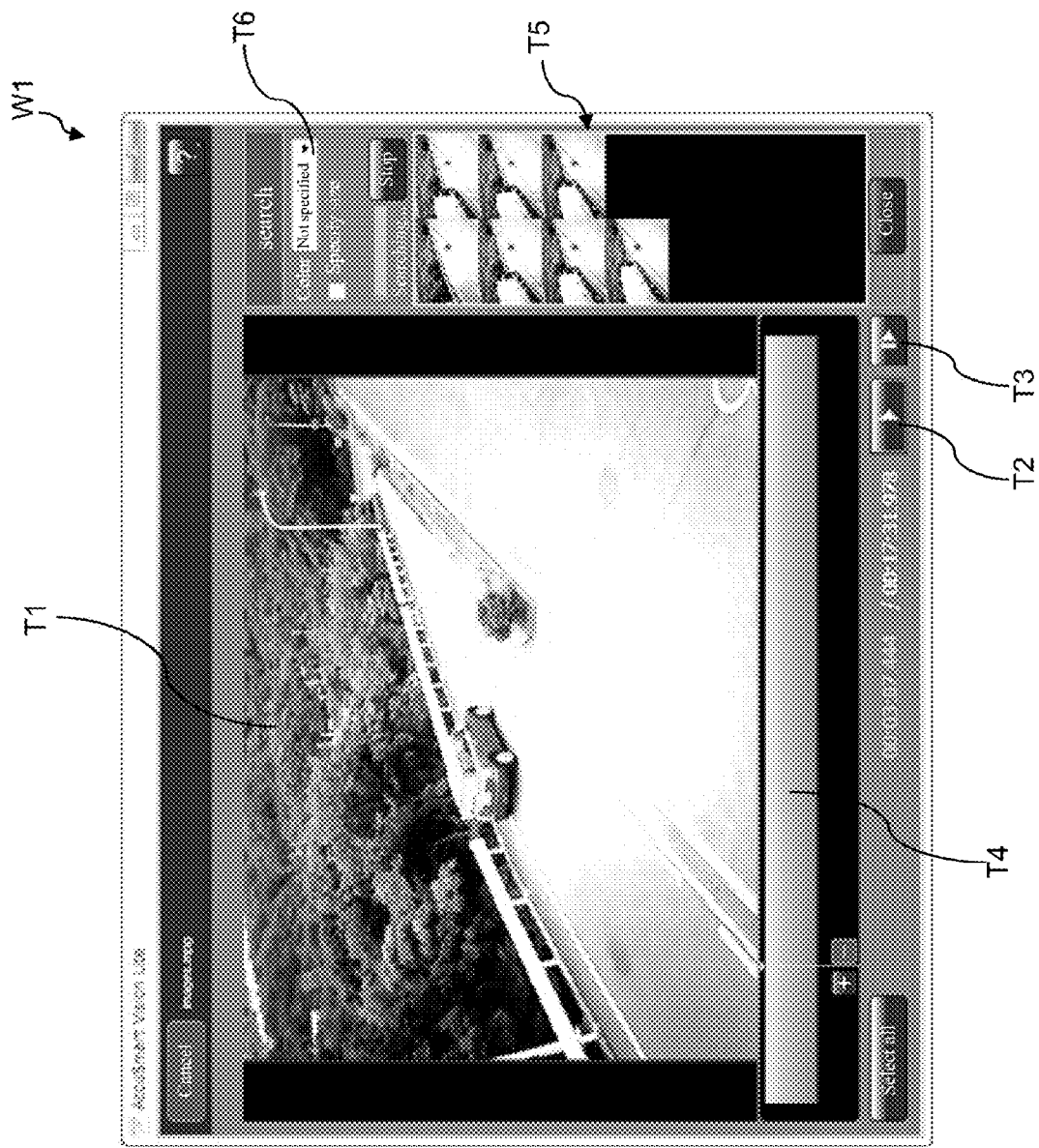
FIG. 8 is a screenshot showing the main screen during execution of the moving object detection process.

In step S12, the display control unit 41 displays a thumbnail image of the frame $F_i$ within the search result area T5 on the main screen W1 (see FIG. 8). It should be noted that the frame $F_i$ at this time refers to not only the search range that is set by the user but the entire frame $F_i$. Then, if the above-described steps S1 to S12 with respect to "i"=1, 2, n have been finished, the moving object detection process ends.

Figure 9:
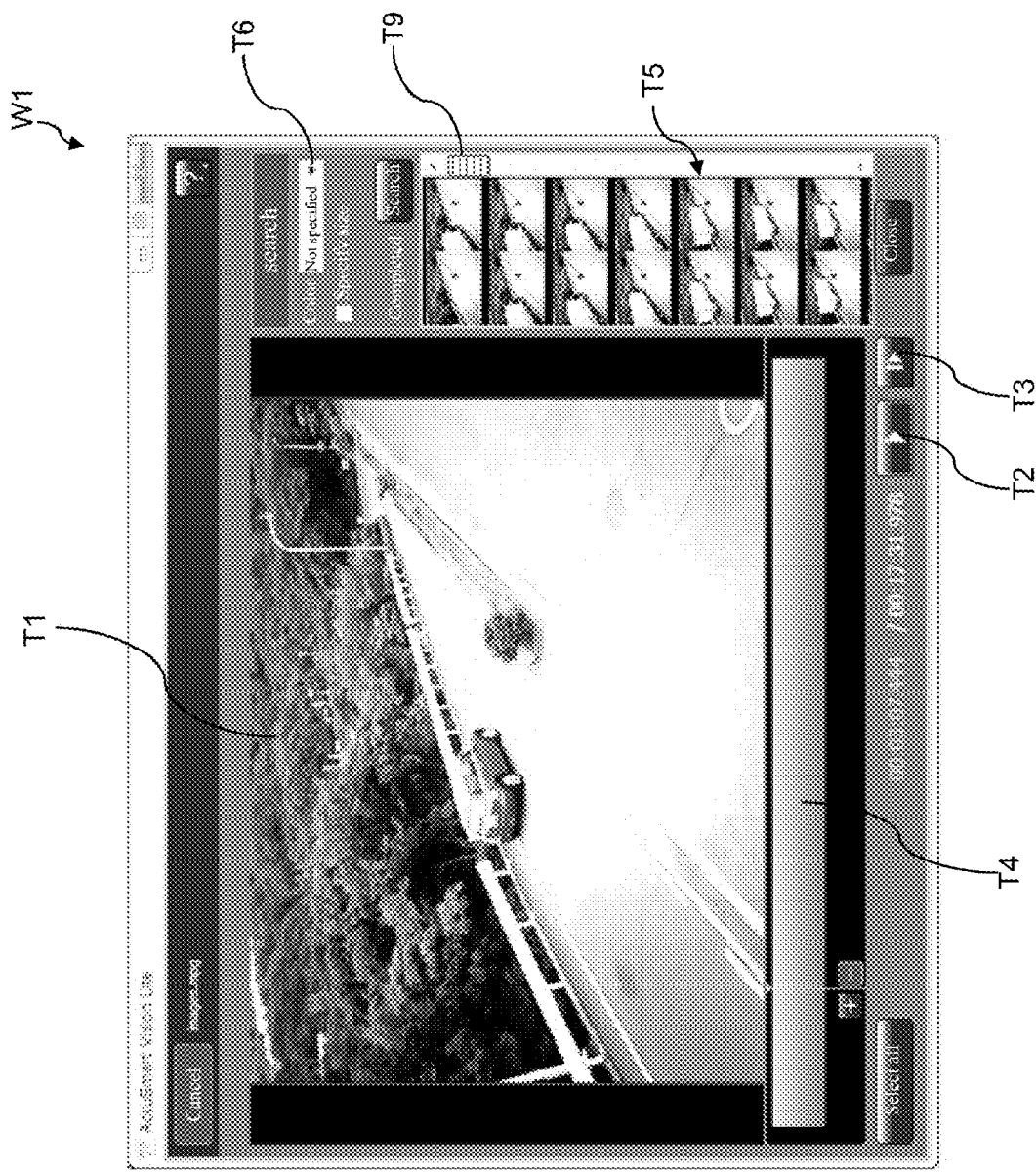
FIG. 9 is another screenshot showing the main screen after execution of the moving object detection process.

FIG. 8 shows the main screen W1 during execution of the moving object detection process. When a large number of frames are ultimately detected, a scroll bar T9 is displayed at the side within the search result area T5, as shown in FIG. 9. Accordingly, no matter how many frames are detected, the user can check all of the search results. In addition, the color setting pull-down menu T6 is still active after the execution of the moving object detection process. If the user changes the set value of this menu, display of the thumbnail images within the search result area T5 is updated in accordance with the changed set color. It should be noted that information on the representative colors that are computed in step S11 is not erased even after the end of the moving object detection process and is stored in association with the respective moving object areas. Accordingly, even when the set color is changed after the execution of the moving object detection process, the display control unit 41 can use this information, thereby instantly switching the display within the search result area T5.

Figure 10:
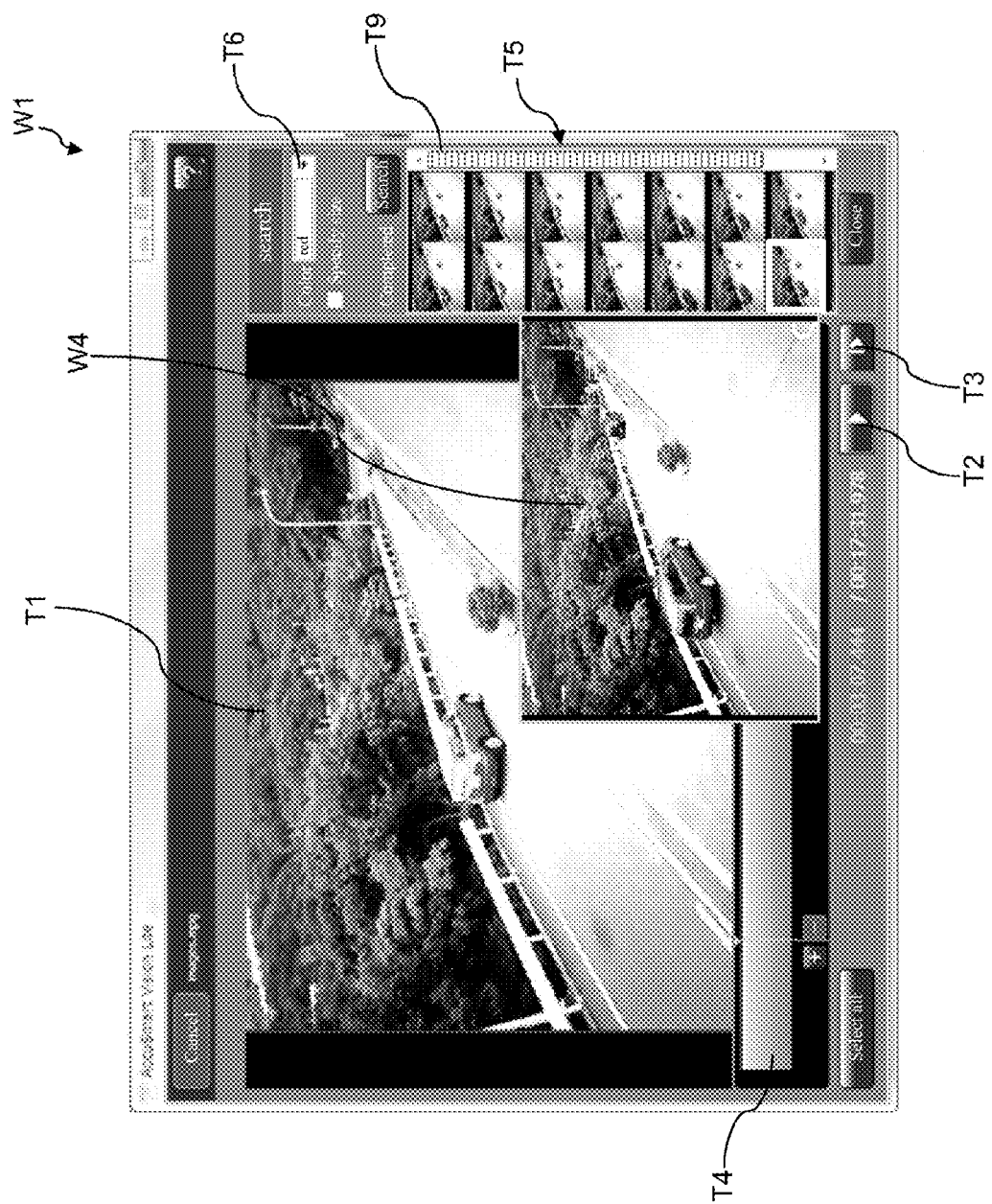
FIG. 10 is a screenshot showing the main screen in a state in which a pop-up window is displayed.

Also, the thumbnail images within the search result area T5 accept selection. Specifically, while the user places the mouse cursor over a particular thumbnail image, a pop-up window W4 that displays an enlarged image of that thumbnail image is displayed near the search result area T5 (see FIG. 10). Accordingly, the user can first check the list of a large number of small thumbnail images that are displayed at the same time and quickly find a frame that seems to be important. At that time, if the user finds a thumbnail image that the user desires to check in more detail, the user can check an enlarged image of that thumbnail image by an easy operation of simply placing the mouse over that thumbnail image. Furthermore, if the user deems that even the enlarged image in the pop-up window W4 is insufficient, the user can click the thumbnail image. At this time, the original image of the thumbnail image that is selected by clicking is displayed within the playback area T1, which is still larger than the pop-up window W4. Therefore, the user can efficiently examine the moving object search results in detail.

3-3. Background Generation Process

Hereinafter, the background generation process in step S5 above will be described with reference to FIG. 11. The background generation process is a process of generating the background image $G_i$ of the frame $F_i$, and here, for each pixel, at least 1 and up to M (M is an integer of 2 or more, and in this embodiment, M=7) background pixel values (hereinafter referred to as "background values") are derived. In the following description, a pixel that is currently being selected within the frame $F_i$ and is located at the coordinates (x, y) is referred to as the pixel $C_{x,y}$, and the pixel value of that pixel is expressed as $D_{x,y}$. Here, x=1, 2, ..., X, y=1, 2, ..., Y, X is the horizontal pixel number of the frame $F_i$, and Y is the vertical pixel number of the frame $F_i$.

Figure 12:
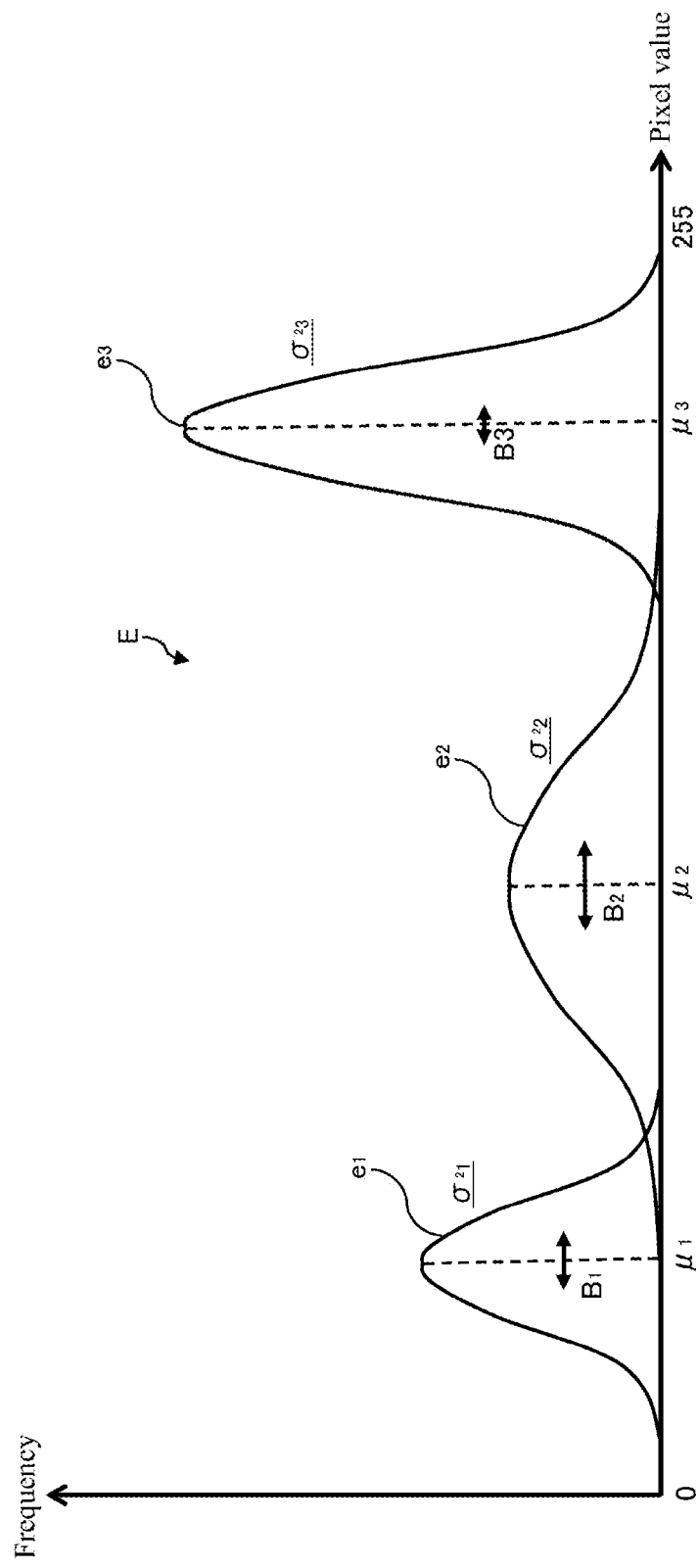
FIG. 12 is a conceptual diagram for explaining a mixed distribution model.

First, an outline of the background generation process will be described. In this process, for each pixel $C_{x,y}$, a mixed distribution model E is generated, and at least 1 and up to M background values are set in accordance with the mixed distribution model E. The mixed distribution model refers to a probability distribution model that combines at least 1 and up to M distribution models $e_j$ depending on the situation, and FIG. 12 shows a mixed distribution model E that is composed of three distribution models. The distribution model $e_j$ is a normal distribution whose mean is $\mu_j$ and variance is $\sigma^2_j$.

Figure 11:
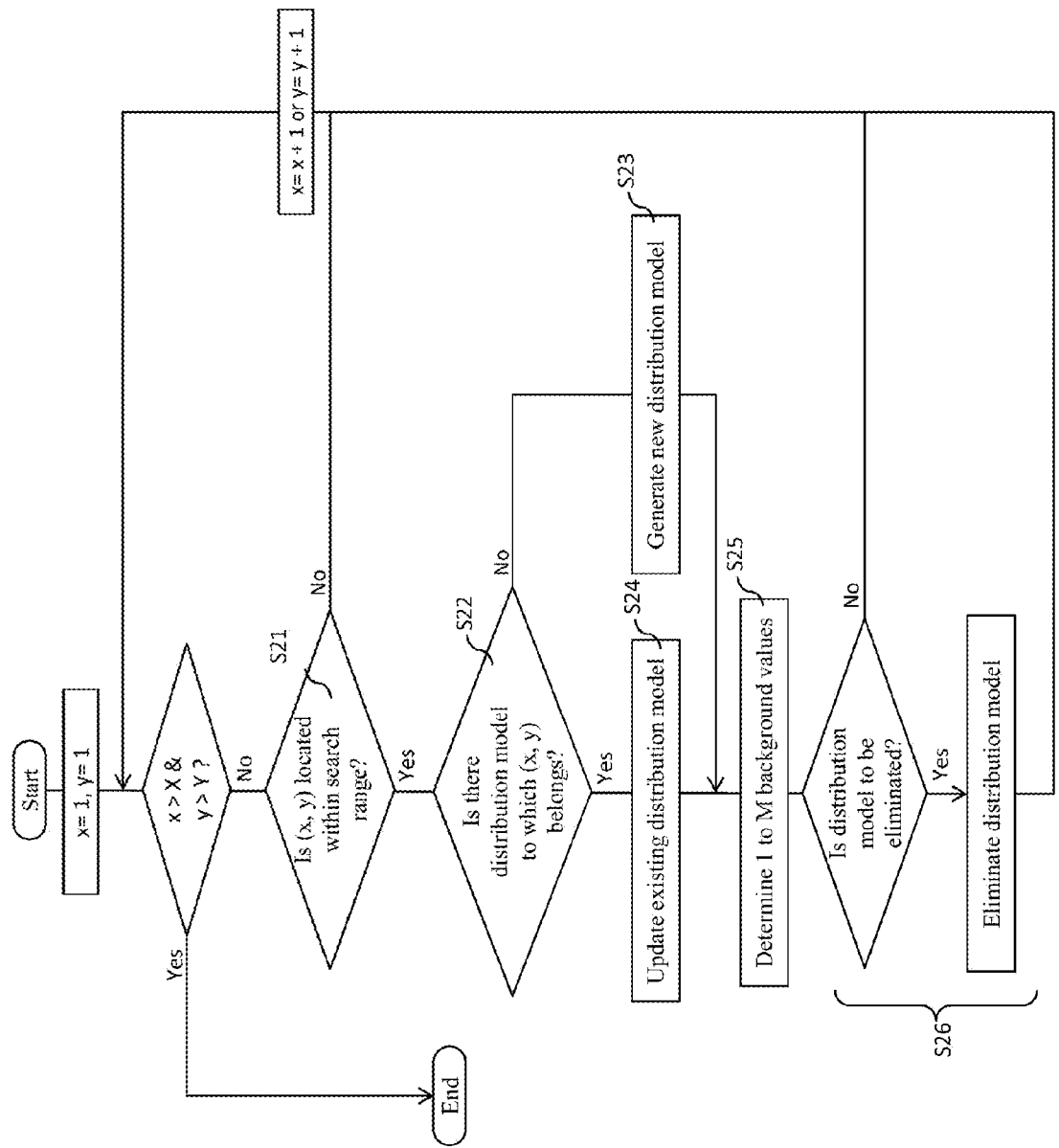
FIG. 11 is a flowchart showing a background generation process.

As shown in FIG. 11, steps S21 to S26, which will be described below, are repeatedly executed with respect to every pixel contained in the frame $F_i$. First, in step S21, the background generation unit 46 refers to the value of the area parameter $P_4$, and judges whether or not the currently selected coordinates (x, y) indicate a point within the search range that is set by the user. Then, if it is judged that the coordinates (x, y) are within the search range, the processing proceeds to step S22, and if not, subsequent processing with respect to the coordinates (x, y) is omitted, and the processing moves on to the next coordinates (x+1, y) or (x, y+1). The reason for this is to prevent a background image $G_i$ from being needlessly generated outside the search range that is set by the user.

In step S22, the model derivation unit 46A judges whether or not the current pixel value $D_{x,y}$ is contained in any of the existing distribution models $e_j$. Specifically, with respect to each of the existing distribution models $e_j$, it is judged whether or not the probability of the pixel value $D_{x,y}$ appearing in that distribution model $e_j$ is greater than or equal to a threshold value. Then, if it is judged that there is a distribution model $e_j$ with respect to which the probability of the pixel value $D_{x,y}$ appearing in that model is greater than or equal to the threshold value, the pixel value $D_{x,y}$ is judged to be contained in that distribution model $e_j$, and the processing proceeds to step S24. On the other hand, if it is judged that there is no relevant distribution model $e_j$, the processing proceeds to step S23. It should be noted that when step S22 is executed for the first time after the start of the moving object detection process, no distribution model $e_j$ is present, that is, no mixed distribution model E is present. Therefore, after step S22 is executed for the first time, the processing proceeds to step S23 without exception.

In step S23, the model derivation unit 46A generates a new distribution model $e_j$. Specifically, the distribution of the pixel values of all the pixels within a local region containing the pixel $C_{x,y}$ (in this embodiment, a 7×7 region around the pixel $C_{x,y}$) in the frame $F_i$ is used as the new distribution model $e_j$. That is to say, the mean $\mu_j$ and the variance $\sigma^2_j$ of the new distribution model $e_j$ are derived using the pixel value $D_{x,y}$ and surrounding pixel values. However, it is also possible to directly use the pixel value $D_{x,y}$ of the pixel $C_{x,y}$ as the mean $\mu_j$.

On the other hand, in step S24, the model derivation unit 46A updates the existing distribution model $e_j$ that has been judged to contain the pixel value $D_{x,y}$ in step S22 just before this step. Specifically, the model derivation unit 46A updates the mean $\mu_j$ and the variance $\sigma^2_j$ of the existing distribution model $e_j$ using the pixel value $D_{x,y}$. When the updated $\mu_j$ and $\sigma^2_j$ are represented by $\mu_j'$ and $\sigma^2_j{}'$, respectively, $\mu_j'$ and $\sigma^2_j{}'$ are expressed by formulae below:

$$\mu_j' = \mu_j \cdot w_1 + D_{x,y} \cdot (1 - w_1)$$

$$\sigma^2_j{}' = \sigma^2_j \cdot w_2 + (D_{x,y} - \mu_j)^2 \cdot (1 - w_2)$$

where $0 < w_1 < 1$ and $0 < w_2 < 1$.

When steps S23 and S24 are finished, the processing proceeds to step S25. In step S25, the background value derivation unit 46B derives a background value of the pixel $C_{x,y}$ from the current mixed distribution model E. Specifically, the region of the mean value $\mu_j \pm \alpha$ of a distribution model $e_j$ contained in the current mixed distribution model E is set as the background value $B_j$ of the pixel $C_{x,y}$ (see FIG. 12). Here, $\alpha$ is a value that is determined in accordance with the variance $\sigma^2_j$. Thus, each background value $B_j$ has a certain range. It should be noted that in this embodiment, the background value $B_j$ is calculated for every distribution model $e_j$ of the at least 1 and up to M distribution models $e_j$. However, it is also possible to generate background values $B_j$ for only a part of the maximum of M distribution models $e_j$. In order to enable evaluation of a plurality of backgrounds such as swaying of plants, movement of clouds in the sky, etc., it is important that a maximum of more than one background value $B_j$ can be generated.

In the next step S26, the model derivation unit 46A judges whether or not a distribution model $e_j$ contained in the mixed distribution model E satisfies a predetermined condition, and if it is judged that a distribution model $e_j$ satisfies the predetermined condition, that distribution model $e_j$ is eliminated. This processing is necessary in order to reduce the number of distribution models $e_j$ to the maximum of M. Specifically, the mixed distribution model E is normalized (the area is made equal to 1), and a distribution model $e_j$ whose area at this time is not larger than a certain size is eliminated. However, in order to prevent a new distribution model $e_j$ from being eliminated immediately after this new distribution model $e_j$ is generated, until a certain period of time has elapsed after the generation of the new distribution model $e_j$, the value of the area that is used in the judgement in this step is raised by multiplying this value with a certain coefficient. When the above-described steps S21 to S26 with respect to all of the pixels $C_{x,y}$ within the frame $F_i$ have been finished, one or more background values are determined for every pixel $C_{x,y}$ (except for the pixels $C_{x,y}$ within the mask region), and the background generation process ends.

4. Features

In the foregoing embodiment, for each pixel of interest, the mixed distribution model E having one or more distribution models $e_j$ for determining one or more background values $B_j$ is updated every moment. In an initial stage at which a sufficient number of frames are not obtained yet, not only the pixel value of the pixel $C_{x,y}$ of interest but also the pixel values of pixels surrounding that pixel $C_{x,y}$ of interest are used. Furthermore, in the foregoing embodiment, even if an outlier that cannot be classified into any existing distribution model $e_j$ occurs during update of the mixed distribution model E, a distribution model $e_j$ is generated using surrounding pixel values of the pixel $C_{x,y}$ of interest. Afterwards, when another frame is obtained, the existing distribution model $e_j$ is updated using the pixel value of the same pixel of interest in the other frame. That is to say, here, during generation of a new distribution model $e_j$, not only the pixel value of the pixel $C_{x,y}$ of interest but also the pixel values of surrounding pixels are used. In other words, on the assumption that a distribution of pixel values that are obtained within a local region around a pixel $C_{x,y}$ of interest within a single frame is generally equal to a temporal distribution of pixel values at the pixel $C_{x,y}$ of interest, before the latter distribution is obtained, the surrounding pixel values of the pixel $C_{x,y}$ of interest are substituted for the temporal distribution of pixel values. Consequently, even in the case of a moving image containing much noise, the effect of such noise can be properly evaluated. Accordingly, it is possible to set an appropriate background value $B_j$ in an initial stage and/or during update of the background image $G_i$ and to detect the moving object with high accuracy.

5. Variations

Although an embodiment of the present invention has been described above, the present invention is not limited to the above embodiment, and various changes can be made thereto without departing from the gist of the present invention. For example, the following changes can be made. Moreover, the essential points of variations below can be combined as appropriate.

5-1

In the foregoing embodiment, the color parameter $P_1$ was selected from predetermined options. However, it is also possible to allow any desired color to be specified by, for example, preparing a color palette on the screen. Moreover, it is possible to allow not only a single color but also a plurality of colors to be specified, and in this case, for example, both of a red vehicle and a white vehicle can be detected.

5-2

The method for calculating the optical flow is not limited to the method described above, but can be replaced by a known technology as appropriate.

5-3

In the foregoing embodiment, pixel values in a surrounding region containing a pixel $C_{x,y}$ of interest were used only in generating a new distribution model $e_j$. However, during a period from generation of a new distribution model $e_j$ until the number of pixel values contained in this distribution model $e_j$ exceed a certain amount, the pixel values within the surrounding region may also be used in updating that model.

5-4

In the foregoing embodiment, in step S11, the representative color(s) is (are) determined for every moving object area. However, the representative color(s) may also be determined on a frame-by-frame basis. That is to say, if a single frame contains a plurality of moving object areas, a color(s) that is (are) representative of the plurality of moving object areas may also be set as the representative color(s).

5-5

In the foregoing embodiment, the background image $G_i$ was calculated for every frame $F_i$. However, the background image $G_i$ may also be updated each time some (e.g., 10) frames are obtained.

5-6

In the foregoing embodiment, it was assumed that both of the size and the shape of an object serving as the search target can be set as the search conditions. However, it is also possible to allow only the size or the shape to be set. Also, the method for specifying the size or the shape is not limited to that described above. For example, it is also possible to allow the shape of the search target to be specified using an auxiliary frame of any desired shape instead of the rectangular auxiliary frame U2.

The invention claimed is:

1. An image processing apparatus configured to detect a moving object in a moving image, the apparatus comprising:
   a background generation unit configured to generate a background image of the moving image while updating the background image over time; and
   a moving object detection unit configured to detect the moving object in the moving image over time based on the background image,
   the background generation unit including:
     a model derivation unit configured to derive a mixed distribution model for each pixel of interest, the mixed distribution model having one or more distribution models depending on a situation; and
     a background value derivation unit configured to derive one or more background pixel values respectively corresponding to the one or more distribution models based on the mixed distribution model for each pixel of interest, and
   wherein the model derivation unit is configured to
     generate a new distribution model from pixel values of a plurality of pixels within a local region containing the pixel of interest in a first frame that is contained in the moving image, and
     update the existing distribution model using a pixel value of the pixel of interest in a second frame that is contained in the moving image and that is different from the first frame.

2. The image processing apparatus according to claim 1, wherein if the mixed distribution model is not present, the model derivation unit is configured to generate a new distribution model.

3. The image processing apparatus according to claim 1, wherein if a pixel value of the pixel of interest in the first frame is not contained in any existing distribution model, the model derivation unit is configured to generate a new distribution model.

4. The image processing apparatus according to claim 2, wherein if a pixel value of the pixel of interest in the first frame is not contained in any existing distribution model, the model derivation unit is configured to generate a new distribution model.

5. The image processing apparatus according to claim 1, further comprising:
   a display control unit configured to display a frame including the detected moving object.

6. The image processing apparatus according to claim 2, further comprising:

a display control unit configured to display a frame including the detected moving object.

7. The image processing apparatus according to claim 3, further comprising:
a display control unit configured to display a frame including the detected moving object.

8. The image processing apparatus according to claim 4, further comprising:
a display control unit configured to display a frame including the detected moving object.

9. The image processing apparatus according to claim 5, wherein if it is detected that the moving object is present in two frames that are contained in the moving image and that are close to each other, and a direction of an optical flow of the moving object between the two frames matches a direction of movement of the centroid of the moving object between the two frames, the display control unit is configured to exclude the moving object in one of the two frames from a display target.

10. The image processing apparatus according to claim 6, wherein if it is detected that the moving object is present in two frames that are contained in the moving image and that are close to each other, and a direction of an optical flow of the moving object between the two frames matches a direction of movement of the centroid of the moving object between the two frames, the display control unit is configured to exclude the moving object in one of the two frames from a display target.

11. The image processing apparatus according to claim 7, wherein if it is detected that the moving object is present in two frames that are contained in the moving image and that are close to each other, and a direction of an optical flow of the moving object between the two frames matches a direction of movement of the centroid of the moving object between the two frames, the display control unit is configured to exclude the moving object in one of the two frames from a display target.

12. The image processing apparatus according to claim 8, wherein if it is detected that the moving object is present in two frames that are contained in the moving image and that are close to each other, and a direction of an optical flow of the moving object between the two frames matches a direction of movement of the centroid of the moving object between the two frames, the display control unit is configured to exclude the moving object in one of the two frames from a display target.

13. The image processing apparatus according to claim 5, further comprising:
a setting unit configured to receive setting of a color of the moving object,
wherein the display control unit is configured to exclude the moving object having a color that is not similar to the set color from the display target.

14. The image processing apparatus according to claim 6, further comprising:
a setting unit configured to receive setting of a color of the moving object,
wherein the display control unit is configured to exclude the moving object having a color that is not similar to the set color from the display target.

15. The image processing apparatus according to claim 7, further comprising:
a setting unit configured to receive setting of a color of the moving object,
wherein the display control unit is configured to exclude the moving object having a color that is not similar to the set color from the display target.

16. The image processing apparatus according to claim 8, further comprising:
a setting unit configured to receive setting of a color of the moving object,
wherein the display control unit is configured to exclude the moving object having a color that is not similar to the set color from the display target.

17. The image processing apparatus according to claim 5, further comprising:
a receiving unit configured to receive setting of a size and/or a shape of the moving object,
wherein the display control unit is configured to exclude the moving object having a size and/or a shape that is not similar to the set size and/or shape from the display target.

18. The image processing apparatus according to claim 1, further comprising:
a judgement unit configured to judge whether or not identical frames consecutively appear in the moving image,
wherein if it is judged that identical frames consecutively appear in the moving image, generation of the background image and detection of the moving object are omitted with respect to a part of the consecutive identical frames.

19. A non-transitory computer-readable medium storing an image processing program for detecting a moving object in a moving image, the program causing a computer to execute the steps of:
generating a background image of the moving image while updating the background image over time; and
detecting the moving object in the moving image over time based on the background image,
the step of generating the background image including the steps of:
deriving a mixed distribution model for each pixel of interest, the mixed distribution model having one or more distribution models depending on a situation; and
deriving one or more background pixel value respectively corresponding to the one or more distribution models based on the mixed distribution model for each pixel of interest, and
the step of deriving the mixed distribution model including the steps of:
generating a new distribution model from pixel values of a plurality of pixels within a local region containing the pixel of interest in a first frame that is contained in the moving image; and
updating the existing distribution model using a pixel value of the pixel of interest in a second frame that is contained in the moving image and that is different from the first frame.

20. An image processing method for detecting a moving object in a moving image, the method comprising the steps of:
generating a background image of the moving image while updating the background image over time; and
detecting the moving object in the moving image over time based on the background image,
the step of generating the background image including the steps of:
deriving a mixed distribution model for each pixel of interest, the mixed distribution model having one or more distribution models depending on a situation; and deriving one or more background pixel values respectively corresponding to the one or more distribution models based on the mixed distribution model for each pixel of interest, and the step of deriving the mixed distribution model including the steps of:

generating a new distribution model from pixel values of a plurality of pixels within a local region containing the pixel of interest in a first frame that is contained in the moving image; and updating the existing distribution model using a pixel value of the pixel of interest in a second frame that is contained in the moving image and that is different from the first frame.

* * * * *